United States Patent [19]

Toda et al.

[11] Patent Number: 5,515,341
[45] Date of Patent: May 7, 1996

[54] PROXIMITY SENSOR UTILIZING POLYMER PIEZOELECTRIC FILM

[75] Inventors: Minoru Toda, Lawrenceville, N.J.; Kyung T. Park, Berwyn; Albert Casciotti, Hershey, both of Pa.

[73] Assignee: The Whitaker Corporation, Wilmington, Del.

[21] Appl. No.: 121,392

[22] Filed: Sep. 14, 1993

[51] Int. Cl.⁶ ............................................. H04R 17/00
[52] U.S. Cl. ................... 367/140; 367/157; 367/908; 367/909; 310/322; 310/324; 310/800; 340/435
[58] Field of Search .................................... 367/140, 157, 367/907, 908, 909; 310/800, 322, 324; 340/904, 435

[56] References Cited

U.S. PATENT DOCUMENTS

| | | | |
|---|---|---|---|
| 3,396,366 | 8/1968 | Midlock et al. | 340/38 |
| 3,816,774 | 6/1974 | Ohnuki et al. | 310/800 |
| 4,015,232 | 3/1977 | Sindle | 340/1 T |
| 4,056,742 | 11/1977 | Tibbetts | 310/357 |
| 4,278,962 | 7/1981 | Lin | 340/34 |
| 4,322,877 | 4/1982 | Taylor | 29/25.35 |
| 4,636,997 | 1/1987 | Toyama et al. | 367/140 |
| 4,803,670 | 2/1989 | Chen | 367/99 |
| 4,910,512 | 3/1990 | Riedel | 340/943 |
| 4,967,180 | 10/1990 | Wang | 340/436 |
| 4,980,869 | 12/1990 | Forster et al. | 367/99 |
| 5,028,920 | 7/1991 | Dombrowski | 340/904 |
| 5,059,946 | 10/1991 | Hollowbush | 340/435 |
| 5,076,384 | 12/1991 | Wada et al. | 180/169 |
| 5,160,927 | 11/1992 | Cherry et al. | 340/904 |

FOREIGN PATENT DOCUMENTS 2218298A  11/1989  United Kingdom.

OTHER PUBLICATIONS

Measurement Science & Technology, vol. 3, No. 3, Mar. 1992, "Ultrasonic transducers and transducer arrays for applications in air".

M. Tamura et al.—"Electroacoustic Transducers with Piezoelectric High Polymer Films";; J. Audio Eng. Society 1975; vol. 23, pp. 21–26.

*Primary Examiner*—J. Woodrow Eldred

[57] ABSTRACT

A transducer assembly for a proximity sensor which comprises an elongated polymer piezoelectric film (16). The film is supported as an elongated series of arcuate segments which are curved in the same direction and have the same radius of curvature. Electrodes (18) on both sides of the piezoelectric film form opposed pairs, each pair being associated with a respective arcuate segment. The electrodes are utilized for applying a varying electric field across the thickness of the film to cause an ultrasonic acoustic wave to be radiated from the film.

3 Claims, 6 Drawing Sheets

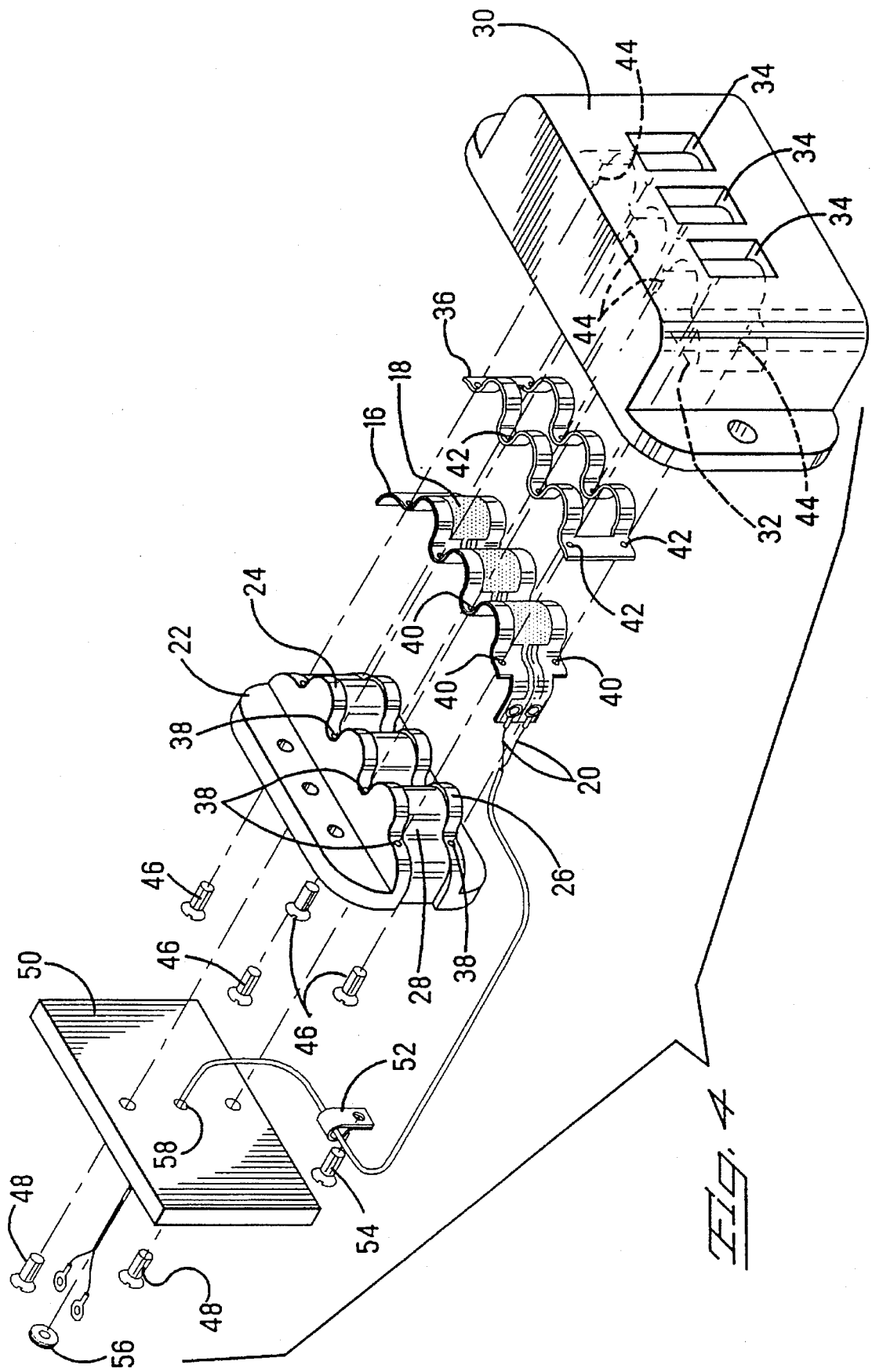

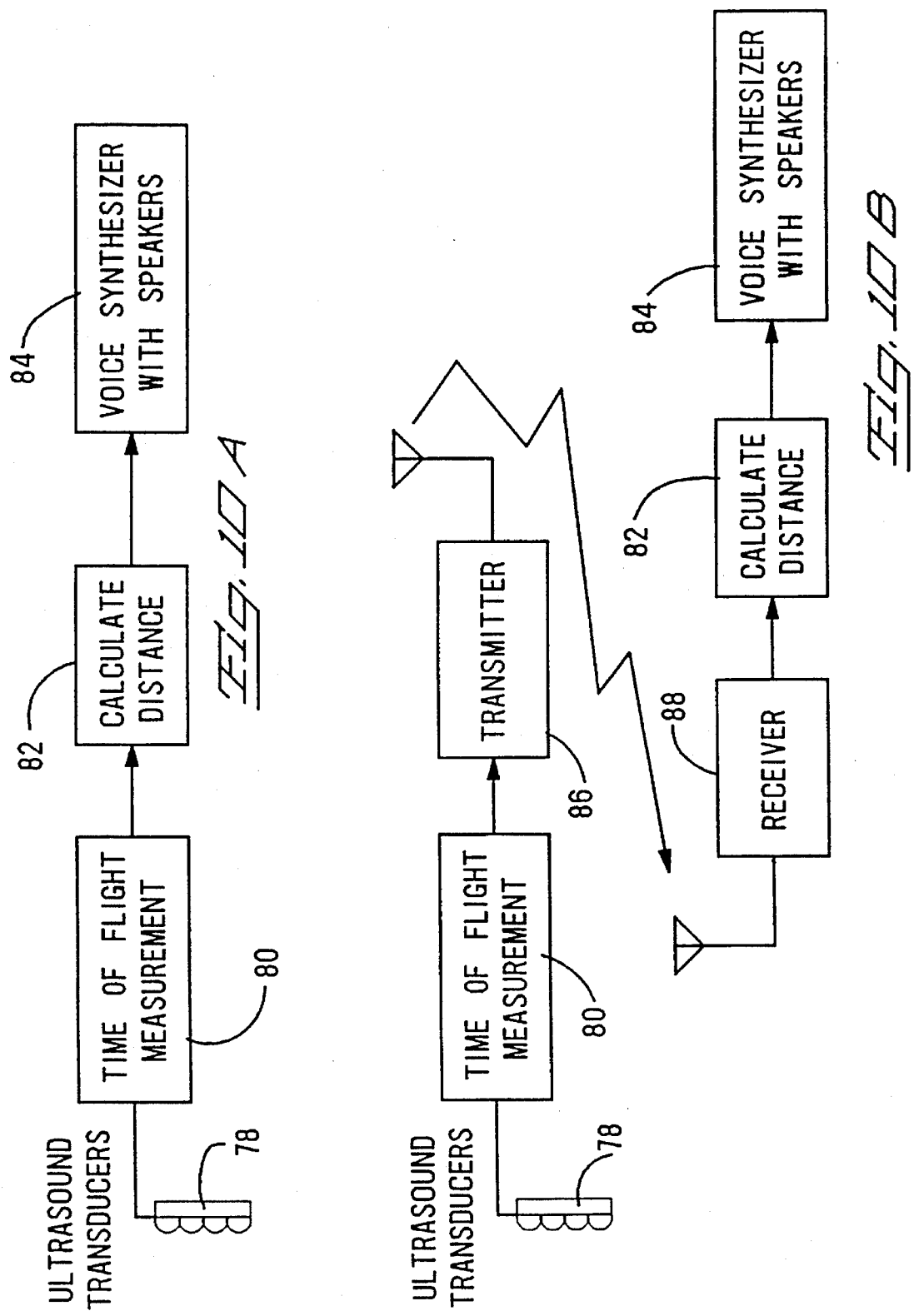

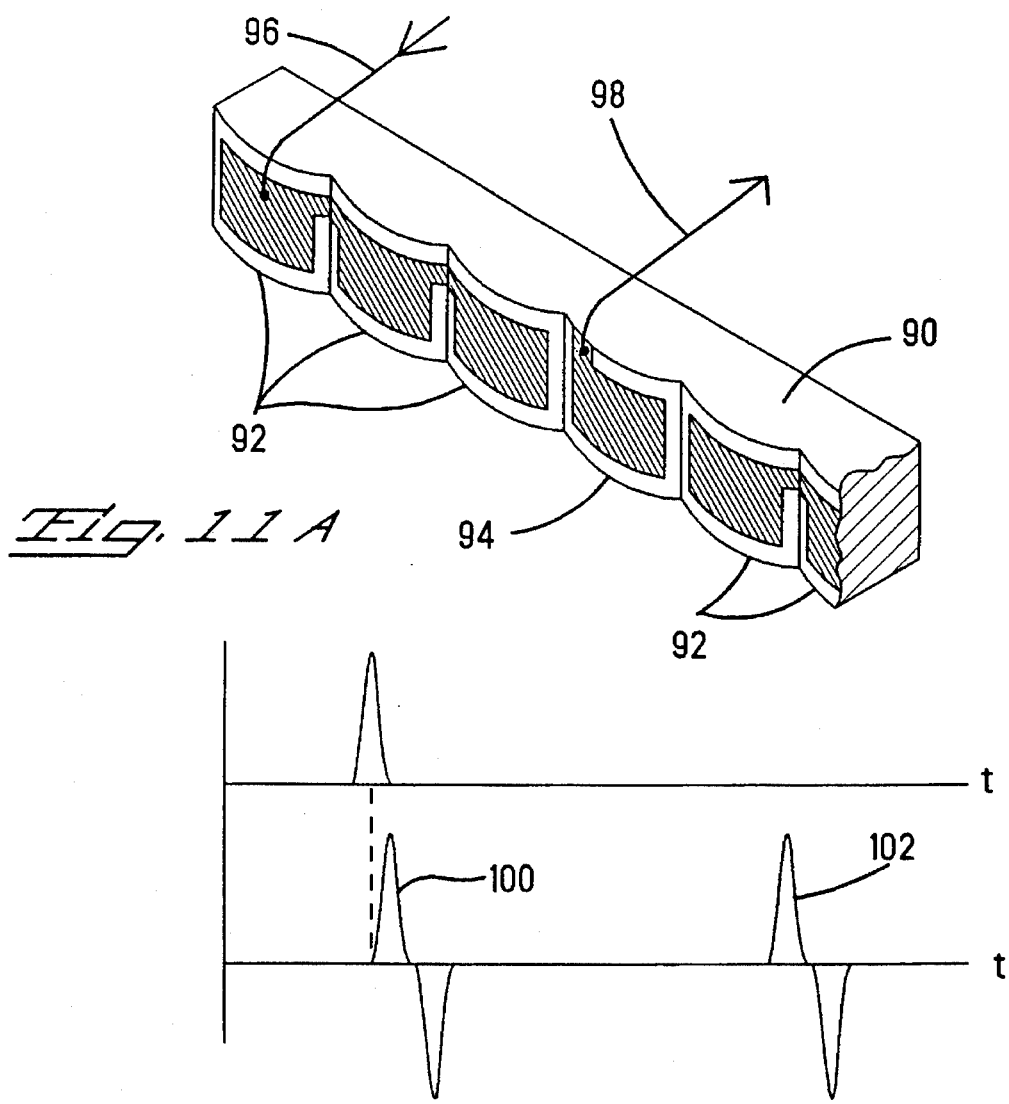
Fig. 11A
Fig. 11B
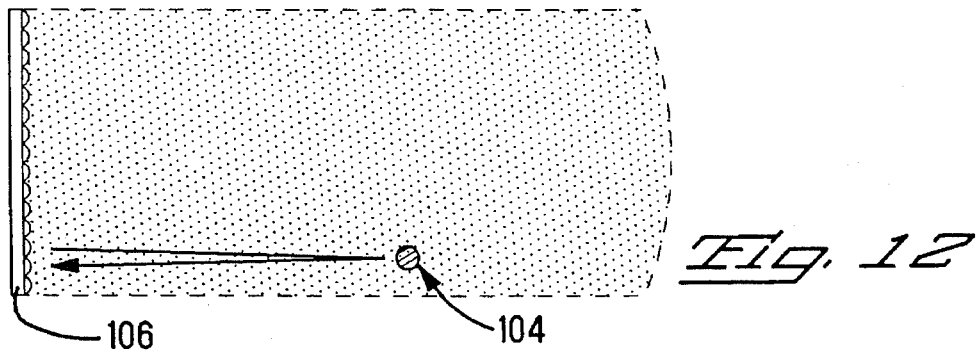
Fig. 12

PROXIMITY SENSOR UTILIZING POLYMER PIEZOELECTRIC FILM

BACKGROUND OF THE INVENTION

This invention relates to ultrasonic proximity sensors and, more particularly, to an improved ultrasonic proximity sensor utilizing polymer piezoelectric film in the transducer assembly.

Proximity sensors have many applications. For example, a proximity sensor mounted to a vehicle can provide a warning to the vehicle operator of the presence of an obstruction in the path of the vehicle. Thus, a proximity sensor mounted to the rear of a truck which is backing toward a loading dock can be utilized to alert the truck driver of the remaining distance to the loading dock. It is therefore an object of the present invention to provide a proximity sensor which may be utilized for such an application.

A proximity sensor utilizing radiated and reflected ultrasonic acoustic waves is a desirable form for use in such an application. The desired beam pattern for obstruction detection applications is a straight, wide and thin beam. It is therefore another object of the present invention to provide a transducer assembly for generating an ultrasonic acoustic wave having such desired beam pattern.

SUMMARY OF THE INVENTION

The foregoing and additional objects are attained in accordance with the principles of this invention by providing a transducer assembly for a proximity sensor which comprises an elongated polymer piezoelectric film. The assembly also includes means for supporting the film as an elongated series of arcuate segments. All of the arcuate segments are curved in the same direction and have the same radius of curvature. In addition, there is provided means for applying a varying electric field across the thickness of the film within each of the arcuate segments to cause an ultrasonic acoustic wave to be radiated from the film.

In accordance with an aspect of this invention, the film supporting means includes a rigid backing member having a support surface shaped as an elongated series of arcuate segments all curved in the same direction and all having the same radius of curvature, and a rigid cover member adapted for placement so that the film is between the backing member and the cover member. The cover member has a cavity with an interior surface shaped complementarily to the backing member support surface. The film supporting means also includes means for securing the cover member to the backing member so that the film is tightly gripped between the backing member support surface and the cover member cavity interior surface.

In accordance with a further aspect of this invention, the cover member is formed with a series of spaced apertures in open communication with the cavity and each associated with a respective one of the arcuate segments of the film, and the transducer assembly further includes means for maintaining the film in spaced relation relative to the backing member in regions corresponding to the apertures of the cover member.

In accordance with another aspect of this invention, the backing member support surface is formed as a pair of spaced apart relatively narrow support surfaces and the space maintaining means comprises a surface region of the backing member between the pair of narrow support surfaces which is generally parallel to the pair of narrow support surfaces and spaced therefrom in a direction away from the cover member.

In accordance with yet another aspect of this invention, the electric field applying means includes a pattern of electrodes formed as conductive areas on both sides of the film, the conductive areas on each side of the film being spaced apart and each being associated with a corresponding conductive area on the other side of the film directly across the thickness of the film so as to form a series of spaced opposed pairs of electrodes.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 4 is an exploded perspective view of an illustrative practical transducer assembly according to this invention;

FIGS. 10A and 10B are illustrative block diagrams of two embodiments of a distance determination and indicating arrangement according to this invention;

FIGS. 11A and 11B are a schematic view of a transducer assembly and illustrative waveforms, respectively, useful for illustrating the self diagnostic capability of the sensor according to this invention; and FIG. 12 shows how the two dimensional position of an obstruction can be determined in accordance with this invention.

DETAILED DESCRIPTION

Figure 1:
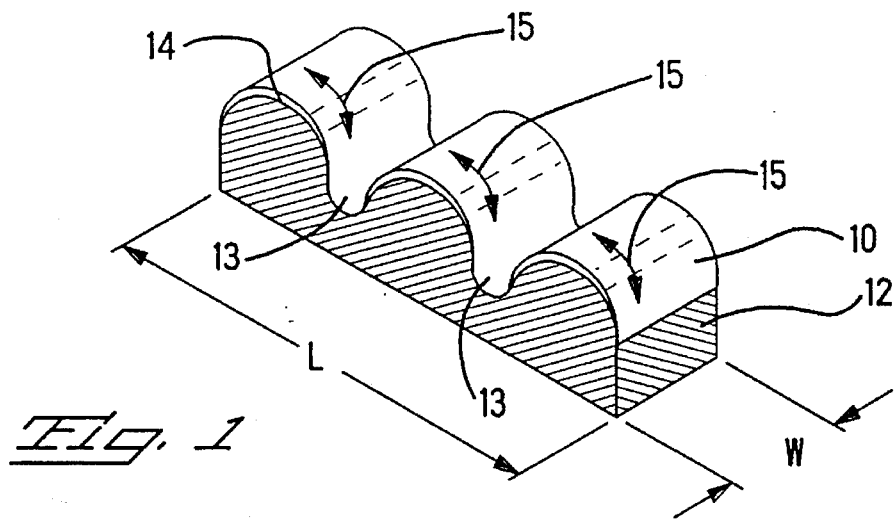
FIG. 1 is a perspective view schematically illustrating an ultrasonic acoustic wave generating transducer utilizing polymer piezoelectric film constructed in accordance with this invention for generating a straight ultrasound beam.
Figure 2:
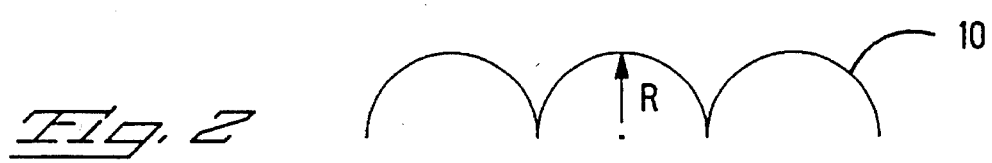
FIG. 2 is a side view showing the polymer piezoelectric film of FIG. 1 and is useful for explaining how the operating frequency of the transducer assembly is determined.

A polymer piezoelectric film is known to be a material that can be used to construct a wideband flexible ultrasound transducer. The desired beam pattern for detecting an obstruction is a straight, wide and thin beam. By lengthening the ultrasound source, the generated beam becomes a relatively straight beam. FIG. 1 illustrates such a transducer according to this invention. As shown therein, the polymer piezoelectric film 10 is elongated and is supported as a series of arcuate segments. The arcuate segments all have the same predetermined radius of curvature and are all curved in the same direction. The film 10 is supported on an appropriately shaped support member 12 so as to maintain a space 14 between each of the arcuate segments of the film 10 and the support member 12. When a varying electric field of appropriate frequency is applied across the thickness of the piezoelectric film 10, the film 10 vibrates at that frequency to cause an ultrasonic acoustic wave to be radiated therefrom. The space 14 allows such vibration without interference by the support member 12.

Polymer piezoelectric material, specifically polyvinylidene fluoride (PVDF or $PVF_2$), is known to be formable into a flexible film even after stretching and poling. When this film 10 is held in a curved shape with two regions 13 clamped, the region between the clamped points vibrates in the direction normal to the plane (increasing or decreasing the radius) by application of AC voltage across the film thickness.

This vibration is caused by expansion or contraction of the length along the molecular chain direction (indicated by the arrows 15) which is chosen to be parallel to the tangential direction to the arc of the film 10. This principle was described in M. Tamura et al "Electroacoustical Transducers with Piezoelectric High Polymer" J. Audio Eng. Society 1975 Vol. 23. p. 21–26. When the drive signal frequency is varied, the back-and-forth vibration shows a maximum at a resonant frequency $f_o$. This resonance is caused by the mass of the film and its elasticity. The resonant frequency is given by the following formula:

$$f_o = (1/2\pi R) \times \sqrt{Y/p}$$

where R equals the radius of the arcuate segment, Y equals Young's modulus and p is the density of the piezoelectric film 10. For example, if R equals 0.2 inches, then the operating frequency $f_o$ equals 45 Khz.

Figure 3A:
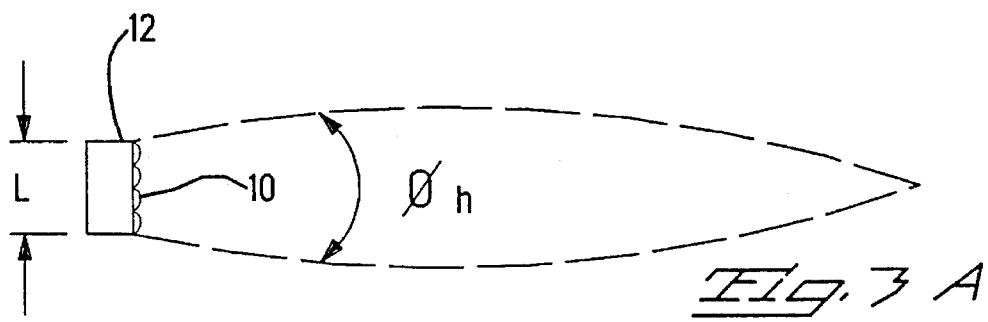
FIGS. 3A and 3B illustrate top and side views, respectively, of an inventive transducer assembly showing the horizontal and vertical, respectively, beam spread angles.
Figure 3B:
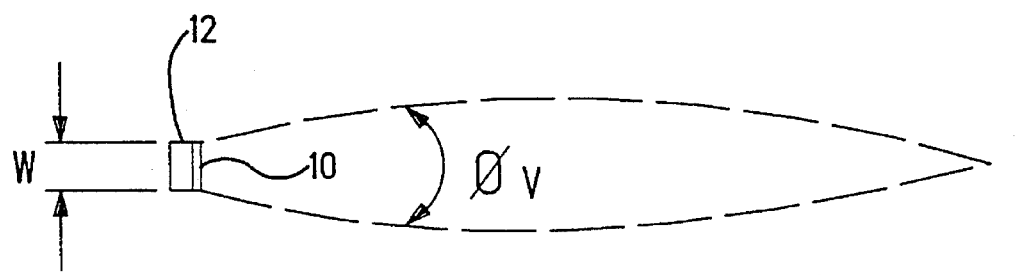

The beam angle of the radiated ultrasonic acoustic wave is determined by the size of the transducer, as shown in FIGS. 3A and 3B. For a transducer length L and width W, the horizontal beam angle $\phi_h$ is given by the following formula:

$$\phi_h = 2 \arcsin(1.895 V_s/(\pi f_o L))$$

and the vertical beam angle $\phi_v$ is given by the following formula:

$$\phi_v = 2 \arcsin(1.895 V_s/(\pi f_o W)),$$

where $V_s$ is the velocity of sound in air. As examples,
$\phi_h = 0°$ for L=7 feet,
$\phi_h = 2.5°$ for L=8 inches, and
$\phi_v = 5°$ for W=4 inches.

FIG. 4 illustrates a practical construction for a transducer assembly of the type schematically shown in FIG. 1. As shown in FIG. 4, an elongated piezoelectric film 16 is provided with a pattern of electrodes 18 on its surface. The electrodes 18 are conductive areas, preferably silver ink, deposited on both sides of the film 16. The electrodes 18 on each side of the film 16 are spaced apart and generally rectangular in configuration and each has an associated conductive area on the other side of the film 16 directly across the thickness of the film so as to form a series of spaced opposed pairs of electrodes. All of the electrodes 18 on each side of the film 16 are interconnected by a pattern of silver ink and at one end of the film are connected to the wires 20. A varying electrical signal applied to the wires 20 at an appropriate frequency (e.g., 45 Khz) causes the piezoelectric film 16 to vibrate and produce an ultrasonic acoustic wave.

A backing member 22 is provided to support the film 16 as a series of arcuate segments. Thus, the backing member 22 includes a first support surface 24 and a second support surface 26. The support surfaces 24, 26 comprise a pair of spaced apart relatively narrow surfaces of the backing member 22, each of which is shaped as a series of arcuate segments all having the same predetermined radius of curvature and all being curved in the same direction. The radius of curvature of each of the segments is selected for the desired operating frequency of the transducer assembly, as previously discussed. In order to maintain appropriate spacing between the film 16 and the backing member 22 to allow the film 16 to vibrate, the backing member 22 is formed with a further surface region 28 between the pair of support surfaces 24, 26. The surface region 28 is generally parallel to the support surfaces 24, 26, but is displaced below the surfaces 24, 26.

In order to hold the film 16 against the backing member 22 and preserve the desired arcuate shape of the film 16, there is provided a cover member 30. The cover member 30 has a cavity 32 with an interior surface which is shaped complementarily to the support surfaces 24, 26. The interior surface of the cavity 32 is continuous between the portions which are complementary to the support surfaces 24, 26, so that when the cover member 30 is mounted to the backing member 22, there is a space between the interior surface of the cavity 32 and the displaced surface region 28 of the backing member 22.

The cover member 30 is formed with a series of spaced apertures 34 in open communication with the interior cavity 32. Each of the apertures 34 is associated with a respective one of the arcuate segments of the backing member 22, and hence the arcuate segments of the film 16, so that the acoustic waves produced when the film 16 is caused to vibrate can escape from the cover member 30.

The assembly shown in FIG. 4 also includes a flexible gasket 36 between the film 16 and the cover member 30, which functions to seal and protect the remainder of the assembly from the elements.

To properly align the backing member 22, the film 16, the gasket 36, and the cover member 30, each of the backing member 22, the film 16, and the gasket 36 is formed with a plurality of appropriately positioned and registrable holes 38, 40 and 42, respectively, and the cover member 30 is molded with a plurality of corresponding pins 44 within the interior cavity 32. During assembly, the pins 44 extend through the aligned holes 38, 40 and 42. A plurality of screws 46 secure the backing member 22 to the cover member 30, with the film 16 and the gasket 36 therebetween, and the screws 48 secure a back plate 50 to the backing member 22 and the cover member 30 as part of the final assembly. Strain relief for the wires 20 is provided by the strain relief element 52 which is secured to the backing member 22 by the screw 54, and a gasket 56 is provided to seal the opening 58 in the back plate 50 through which the wires 20 extend.

Figure 5:
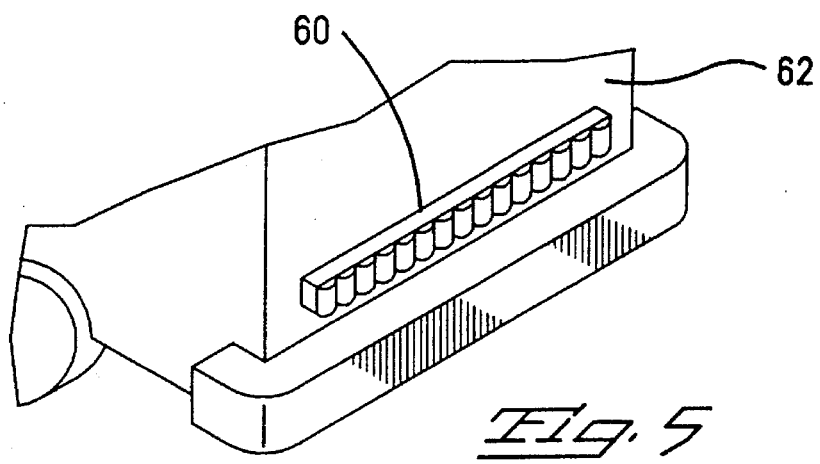
FIG. 5 shows an illustrative mounting arrangement for the assembly of FIG. 4.

FIG. 5 illustrates the mounting of an elongated transducer assembly 60 to the rear of a vehicle, illustratively a truck 62. As shown, the assembly 60 is an elongated version of the assembly depicted in FIG. 4.

Figure 6A:
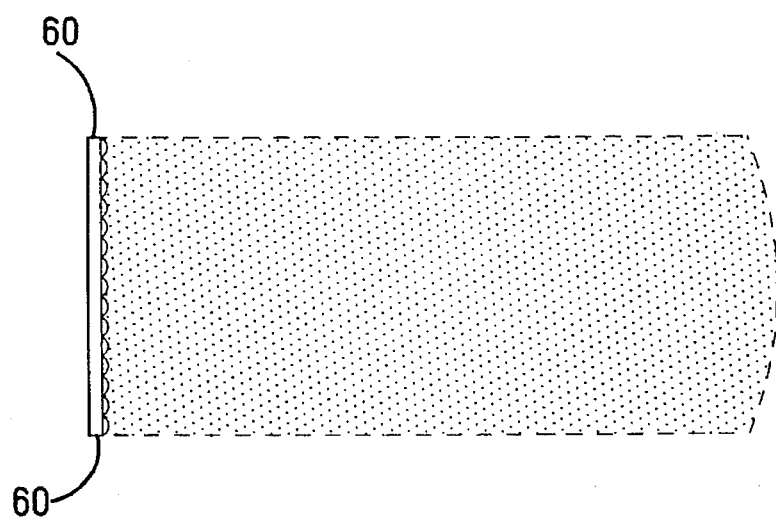
FIGS. 6A and 6B illustrate top and side views, respectively, of a first embodiment of a proximity sensor utilizing a single transducer assembly for both transmission and reception.
Figure 6B:
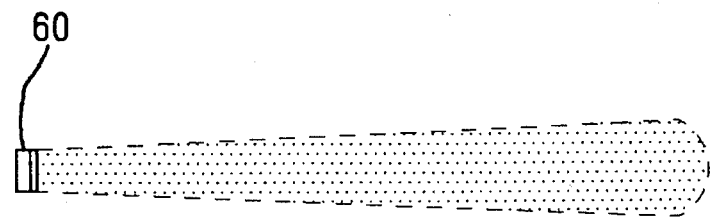

FIGS. 6A and 6B illustrate top and side views of the transducer assembly 60 (FIG. 5) showing the beam pattern thereof. With the length of the transducer assembly 60 being approximately seven feet, the top view of FIG. 6A shows the beam pattern to be straight and the side view of FIG. 6B shows, for a height of four inches for the assembly 60, that the vertical beam spread is 5°. The width of the assembly 60 as shown in FIG. 6A is 7' and the height of the assembly 60 is 4" as shown in FIG. 6B. To maximize system efficiency, all of the arcuate segments of the piezoelectric film making up the assembly 60 are active during the transmission mode and only one or two of the arcuate segments are active during the receive mode.

Figure 7:
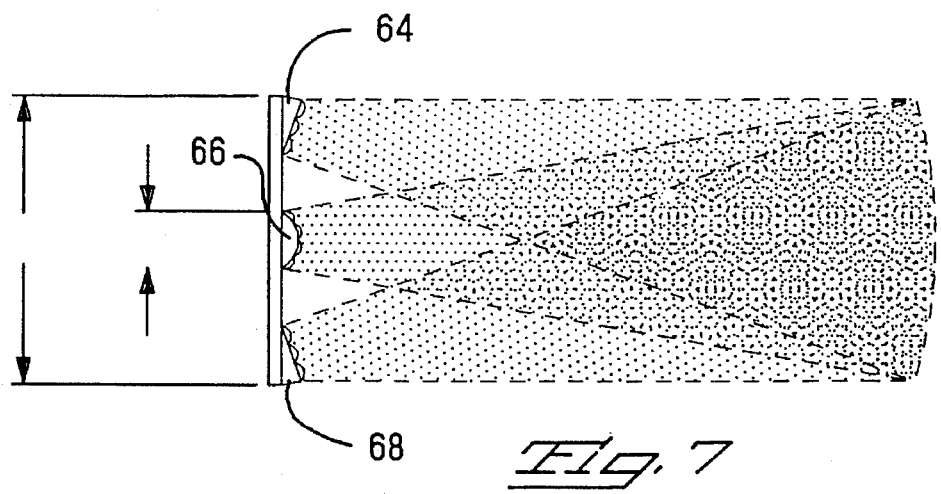
FIG. 7 shows a top view of a second embodiment of a proximity sensor according to this invention and utilizing three separate transducer assemblies, each of which functions as both a transmitter and a receiver.

FIG. 7 is a top view of an embodiment of a proximity sensor which utilizes three separate transducer assemblies 64, 66 and 68, each of which is constructed as shown in FIG. 4, with the exception that the central transducer assembly 66 is curved, rather than straight. Thus, as shown in FIG. 7, the assemblies 64, 66 and 68 are mounted with their major axes lying substantially in a single horizontal plane. The flanking transducer assemblies 64 and 68 are equally spaced from the central transducer assembly 66 and are oppositely angled each toward the central transducer assembly 66. Since the assemblies 64, 66 and 68 are relatively short, they have a noticeable beam spread. However, as shown in FIG. 7, by utilizing the appropriate mounting angles for the flanking assemblies 64 and 68, the overall beam, made up of overlapping beams, can be considered to be relatively straight. Additionally, it will be noted that there are two blind zones between pairs of the transducer assemblies 64, 66 and 68, but these blind zones can be minimized by properly arranging the mounting angles for the flanking assemblies 64 and 68. Each of the transducer assemblies 64, 66 and 68 is operated as both a transmitter and receiver.

Figure 8:
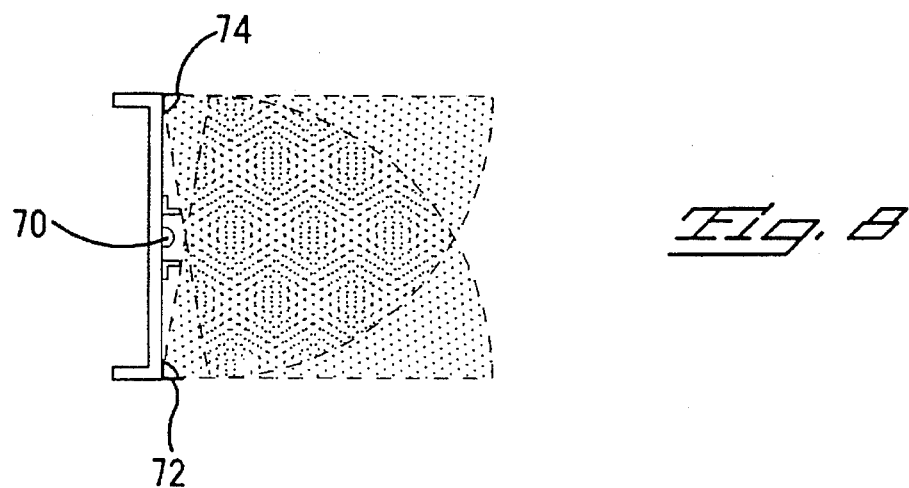
FIG. 8 shows a top view of a third embodiment of a proximity sensor according to this invention and utilizing three transducer assemblies, two of which operate as transmitters and the third of which operates as a receiver.

FIG. 8 is a top view of a further embodiment wherein a single arcuate segment transducer assembly 70 is utilized as a receiver and a pair of transmitter transducer assemblies 72 and 74, each of which produces a substantially 90° beam pattern, are equally spaced on either side of the transducer assembly 70. With the arrangement shown in FIG. 8, the detection range is limited, being substantially the same as the spacing between the transducer assemblies 72 and 74, but measurement accuracy is very high.

Figure 9:
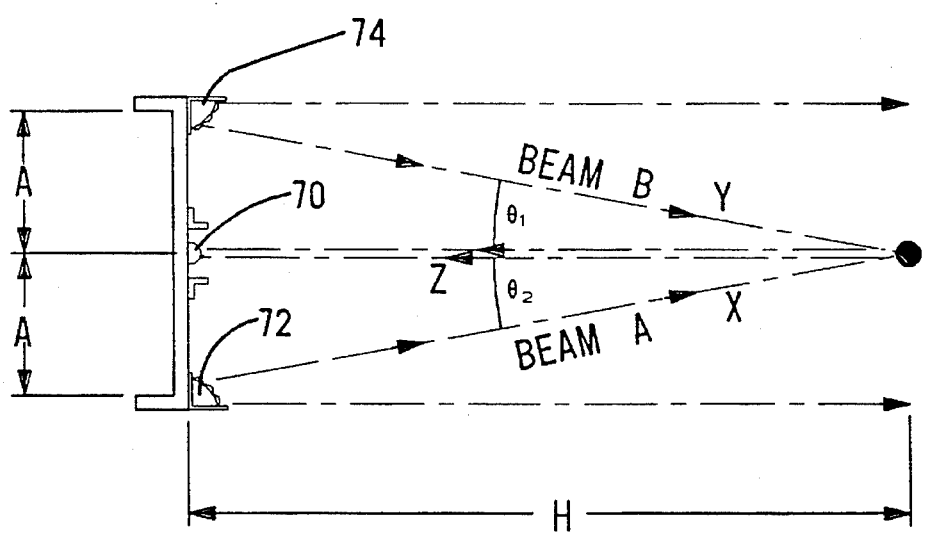
FIG. 9 is a diagram useful for explaining how the distance between the sensor of FIG. 8 and an obstruction can be calculated.

FIG. 9 illustrates how the distance between an obstruction 76 and the proximity sensor of FIG. 8 can be calculated from the measured time of flight from the transmitters 72, 74 to the receiver 70. Thus, when an acoustic wave is transmitted from the assembly 72, reflected from the obstruction 76, and received by the receiver 60, its measured time of flight $k_1$ is:

$$k_1 = (X+Z)/V_s$$

and the time of flight $k_2$ from the transmitter 74 is:

$$k_2 = (Y+S)/V_s;$$

where $V_s$ is the velocity of sound in air.

X, Y and Z are solved from the following equations:

$$A^2 = X^2 + Z^2 - 2XZ \cos \theta_1$$

$$A^2 = Y^2 + Z^2 - 2YZ \cos \theta_2$$

$$(2A)^2 = X^2 + Y^2 - 2XY \cos(\theta_1 + \theta_2),$$

where A is the known spacing between each of the transmitters 72, 74 and the receiver 70. The distance H can then be calculated from X, Y and Z using known trigometric and geometric relations.

FIG. 10A illustrates an application of the present invention wherein a transducer assembly 78, of the type described, is connected to circuitry 80 which measures the time between transmission and reception of an ultrasonic pulse. This measurement is provided to distance calculator 82 which determines the distance to the obstruction and provides this information to the voice synthesizer 84, which provides an audible indication to the driver. Alternatively, as shown in FIG. 10B, the measurement circuit 80 and the calculator circuit 82 can be connected via a wireless transmission scheme comprising the transmitter 86 and the receiver 88 if it is more convenient to use this method than running wires between the front and rear of a vehicle.

An advantage of utilizing the piezoelectric film in a transducer assembly of the type described is that a self diagnostic function can be designed. Thus, as shown in FIG. 11A, the transducer assembly 90 is made up of transmitting elements 92 and receiving elements 94. When a pulse is applied to the transmitting elements 92 over the lead 96, the generated acoustic wave is directly fed to the receiving element 94 through the air. FIG. 11B illustrates the input electric pulse and the output of the receiver element 94 over the lead 98 which includes a pulse 100 in response to the direct feed through the air followed by a pulse 102 in response to a reflected signal from an obstruction. The first pulse 100 is used for diagnostic purposes to indicate that the system is operative, but is ignored for measuring distance, when only the second pulse 102 is considered.

FIG. 12 illustrates how the two dimensional position coordinates of an obstruction 104 can be determined. Thus, as shown in FIG. 12, the transducer assembly 106 is made up of a plurality of individual transmitter elements. Each of the elements is activated in sequence and by calculating the time of flight of the acoustic pulse to each of the receiver elements, the position coordinates of the obstruction 104 can be determined in two dimensions.

Accordingly, there has been disclosed an improved ultrasonic proximity sensor utilizing piezoelectric film in the transducer assembly. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

We claim:

1. A proximity sensing system comprising:

three transducer assemblies (64, 66, 68) each including:
 a) an elongated polymer piezoelectric film;
 b) means for supporting said film as an elongated series of arcuate segments, all of said segments having the same predetermined radius of curvature and all of said segments being curved in the same direction; and
 c) means for applying a varying electric field across the thickness of said film within each of said arcuate segments to cause an ultrasonic acoustic wave to be radiated from said film;

means for mounting said transducer assemblies with their major axes lying substantially in a single plane so that there is a central transducer assembly and two flanking transducer assemblies equally spaced from said central transducer assembly, the two flanking transducer assemblies being oppositely angled each toward the central transducer assembly, whereby the acoustic waves radiated from the three transducer assemblies overlap as they travel away from the transducer assemblies;

means (80) for sensing an acoustic wave impinging on said transducer assembly films which is a reflection of the radiated acoustic waves from a remote object and generating an electrical signal representative thereof; and means (82) utilizing said electric signal for determining the distance of said object from the system.

2. A proximity sensing system comprising:

three transducer assemblies (70, 72, 74) each including:

a) an elongated polymer piezoelectric film; and b) means for supporting said film as an elongated series of arcuate segments, all of said segments having the same predetermined radius of curvature and all of said segments being curved in the same direction;

means for mounting said transducer assemblies with their major axes lying substantially in a single plane so that there is a central transducer assembly (70) and two flanking transducer assemblies (72, 74) equally spaced from said central transducer assembly, the two flanking transducer assemblies being oppositely angled each toward the central transducer assembly;

means for applying a varying electric field across the thickness of said film within each of said arcuate segments of each of the flanking transducer assemblies to cause ultrasonic acoustic waves to be radiated from said flanking transducer assemblies, the radiated acoustic waves overlapping as they travel away from the flanking transducer assemblies;

means (80) for sensing an acoustic wave impinging on said central transducer assembly film which is a reflection of the radiated acoustic waves from a remote object and generating an electrical signal representative thereof; and means (82) utilizing said electrical signal for determining the distance of said object from the system.

3. A transducer assembly for a proximity sensor, comprising:

an elongated polymer piezoelectric film (16);

a pattern of electrodes (18) formed as conductive areas on both sides of said film, the conductive areas on each side of said film being spaced apart and each having an associated conductive area on the other side of said film directly across the thickness of the film to form a series of spaced opposed pairs of electrodes;

a rigid backing member (22) having a pair of narrow parallel support surfaces (24, 26) each shaped as an elongated series of arcuate segments, all of said arcuate segments having the same predetermined radius of curvature and all being curved in the same direction, and a further surface region (28) between said pair of support surfaces and displaced below said pair of support surfaces;

a rigid cover member (30) having a holding surface shaped complementarily to said pair of backing member support surfaces and a plurality of spaced apertures (34) adapted for alignment with the spaced opposed pairs of electrodes of said film; and means (46) for securing said cover member to said backing member with said film therebetween so that the film is tightly gripped between the cover member holding surface and the backing member support surfaces with the cover member apertures each in registry with a respective opposed pair of electrodes of the film.

* * * * *